US012558703B2

(12) United States Patent
Suka

(10) Patent No.: US 12,558,703 B2
(45) Date of Patent: Feb. 24, 2026

(54) CONTROL METHOD OF COATING DEVICE

(71) Applicant: TIPTON CORP., Nagoya (JP)

(72) Inventor: Hiroshi Suka, Nagoya (JP)

(73) Assignee: TIPTON CORP., Nagoya (JP)

( * ) Notice: Subject to any disclaimer, the term of this patent is extended or adjusted under 35 U.S.C. 154(b) by 37 days.

(21) Appl. No.: 18/569,151

(22) PCT Filed: Sep. 24, 2021

(86) PCT No.: PCT/JP2021/035073
§ 371 (c)(1),
(2) Date: Dec. 11, 2023

(87) PCT Pub. No.: WO2023/047529
PCT Pub. Date: Mar. 30, 2023

(65) Prior Publication Data
US 2024/0286162 A1     Aug. 29, 2024

(51) Int. Cl.
*B05C 3/08* (2006.01)
*A23G 3/34* (2006.01)
*A23G 4/02* (2006.01)

(52) U.S. Cl.
CPC .............. *B05C 3/08* (2013.01); *A23G 3/0095* (2013.01); *A23G 4/025* (2013.01)

(58) Field of Classification Search
None
See application file for complete search history.

(56)          References Cited

FOREIGN PATENT DOCUMENTS

| JP | B4 2009-078232 A | 4/2009 |
| JP | 4685959 B1 | 5/2011 |
| JP | 2011189233 A * | 9/2011 |
| JP | 2012-183500 A | 9/2012 |

OTHER PUBLICATIONS

International Search Report dated Nov. 16, 2021 for International Patent Application No. PCT/JP2021/035073 (3 pages in Japanese; 2 pages English translation).
Written Opinion of the International Searching Authority dated Nov. 16, 2021 for International Patent Application No. PCT/JP2021/035073 (3 pages in Japanese).

* cited by examiner

*Primary Examiner* — Alexander M Weddle
(74) *Attorney, Agent, or Firm* — Smith, Gambrell & Russell, LLP

(57)          ABSTRACT
Provided is a control method of a coating device that can perform coating of coating targets well. The control method of a coating device includes a coating tank (25) which includes a drum (28A) having a cylindrical shape and rotatable, and a disk (38A) having a dish shape and disposed to close a lower end of the drum (28A) and rotatable coaxially with the drum (28A). The method executes a first rotation process of setting a posture of the coating tank (25) in a standing posture in which a rotation axis of the coating tank (25) is directed in a vertical direction, rotating the drum (28A) in one direction, and rotating the disk (38A) in the other direction, and a second rotation process of setting a posture of the coating tank (25) in an inclined posture in which the rotation axis is inclined with respect to the vertical direction and rotating the drum (28A) and the disk (38A) in the one direction.

3 Claims, 8 Drawing Sheets

CONTROL METHOD OF COATING DEVICE

TECHNICAL FIELD

The present invention relates to a control method of a coating device.

BACKGROUND ART

Patent Literature 1 discloses a coating device including a coating tank in which each of a drum and a disk is individually rotatable. This coating device can change the posture of the coating tank to a standing posture in which the rotation axis is vertical and an inclined posture in which the rotation axis is inclined at a predetermined angle with respect to the vertical direction. This coating device can individually change the rotation speed and the rotation direction of each of the drum and the disk in each of the case where the coating tank is in the standing posture and the case where the coating tank is in the inclined posture. For example, in a state where the coating tank is set in a standing posture, coating targets are input, and the disk is rotated in one direction. Then, a centrifugal force is applied to the coating targets so that the coating targets reach the inner peripheral surface of the drum. At this time, by rotating the drum in the other direction, a stirring force is applied to the coating targets having reached the drum, so that the coating targets quickly flow down toward the center of the disk. Consequently, the coating device of Patent Literature 1 can cause the coating targets to flow actively in the coating tank, and can shorten the time required for coating the coating targets. Furthermore, after the above operation in the standing posture, the coating tank is set in the inclined posture, and the drum is rotated in one direction together with the disk, whereby unevenness of the coating of each coating target can be reduced.

CITATIONS LIST

Patent Literature

Patent Literature 1: Japanese Patent No. 4685959

SUMMARY OF INVENTION

Technical Problems

Here, it is not preferable to stop rotation of both the drum and the disk when changing the posture of the coating tank from the standing posture (in which rotation directions of the drum and the disk are opposite) to the inclined posture (in which rotation directions of the drum and the disk are the same) in the middle of coating because the coating targets may adhere to the inner peripheral surface of the coating tank. Thus, it is preferable that either the drum or the disk is always rotating during execution of coating. Here, if the rotation of the disk is continued and only the rotation of the drum is stopped, the coating targets to which the centrifugal force is applied by the disk collide with the drum, which may cause the drum to be co-rotated, with the result that it might become impossible to change the rotation direction of the drum.

The control method of a coating device of the present disclosure has been completed based on the above circumstances, and an object thereof is to provide a control method of a coating device that can coat coating targets well.

Solutions to Problems

A control method of a coating device of the present invention is a control method of a coating device including a coating tank. The coating tank includes a drum having a cylindrical shape and rotatable, and a disk having a dish shape and disposed to close a lower end of the drum and rotatable coaxially with the drum. The method includes execution of a first rotation process of setting a posture of the coating tank in a standing posture in which a rotation axis of the coating tank is directed in a vertical direction, rotating the drum in one direction, and rotating the disk in an other direction, and a second rotation process of setting a posture of the coating tank in an inclined posture in which the rotation axis is inclined with respect to the vertical direction and rotating the drum and the disk in the one direction.

Advantageous Effects of Invention

By the first rotation process, the time required for coating the coating targets can be shortened, and by the second rotation process, unevenness of the coating of each coating target can be reduced. Thus, the coating targets can be coated well.

DESCRIPTION OF EMBODIMENTS

Embodiment 1

Figure 1:
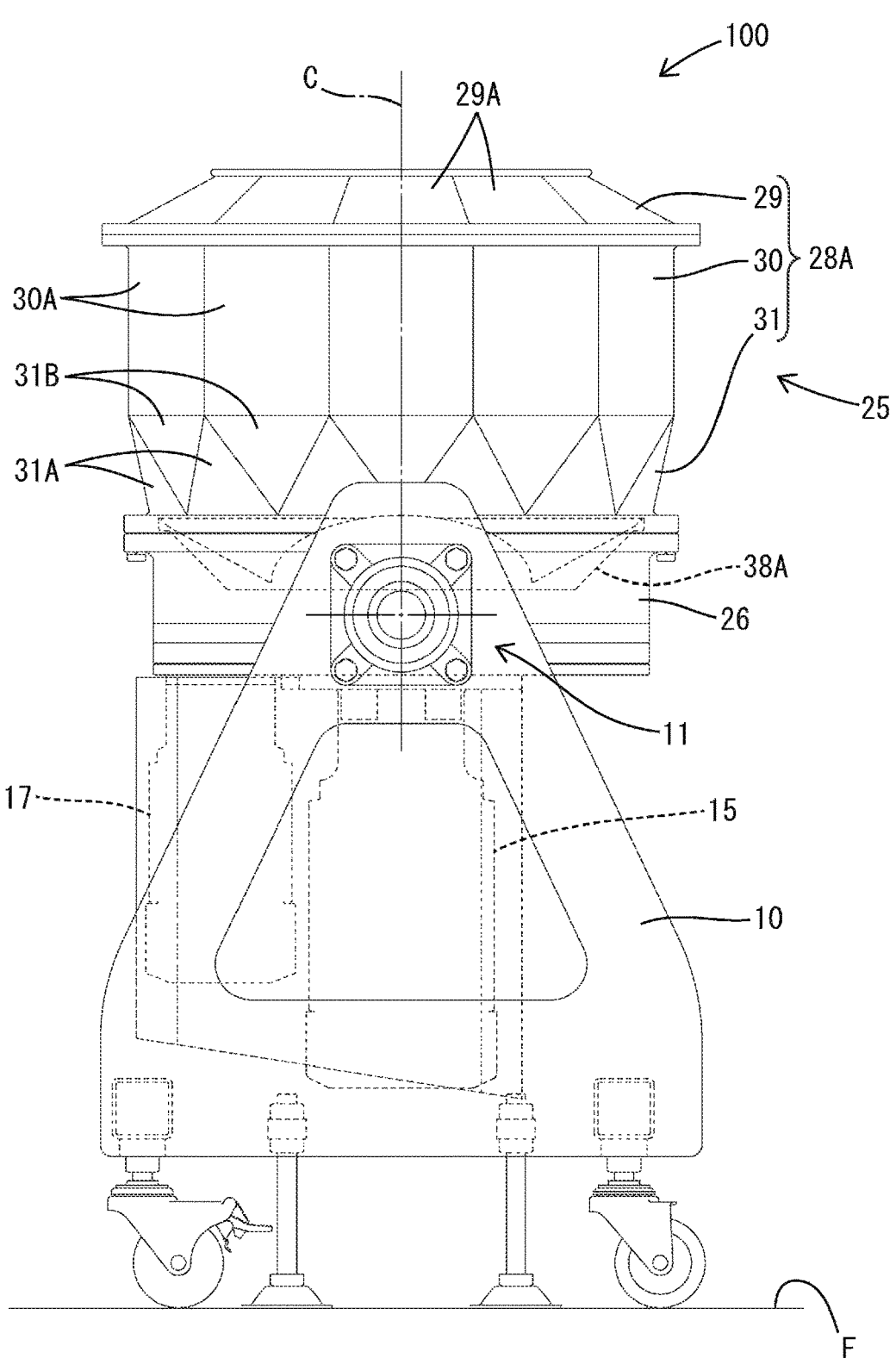
FIG. 1 is a side view illustrating a state in which a coating tank of Embodiment 1 is set in a standing posture.

Hereinafter, Embodiment 1 in which the present invention is embodied will be described with reference to FIGS. 1 to 8. A coating device 100 in which the control method of the present invention is executed includes a coating tank 25. In the coating tank 25, a coating layer made of a coating agent such as chocolate, syrup, or sugar can be formed on the surface of a coating target (hereinafter, also called a center) serving as a core of chocolate confectionery, chewing gum, bean confectionery, or tablet, for example. The coating tank 25 can change its posture between a standing posture illustrated in FIG. 1 (posture in which a rotation axis C of the coating tank 25 is substantially in the vertical direction) and an inclined posture illustrated in FIG. 3 (posture in which the rotation axis C of the coating tank 25 is in an oblique direction with respect to the vertical direction) by a tilting mechanism 11 provided on a base 10 placed on a floor F. The coating tank 25 includes an underplate 26 made of stainless steel, a drum 28A made of stainless steel, and a disk 38A made of stainless steel.

The coating device 100 is compatible with, depending on the type of the center, any mode of use, i.e., the mode in which coating treatment in the standing posture and coating treatment in the inclined posture are both used, and the mode in which coating treatment is performed only in either one of the standing posture and the inclined posture. In the following description, with the orientation illustrated in FIG. 1 being defined as up and down as it is, the up-down direction is based on a state in which the coating tank 25 is in the standing posture.

Figure 2:
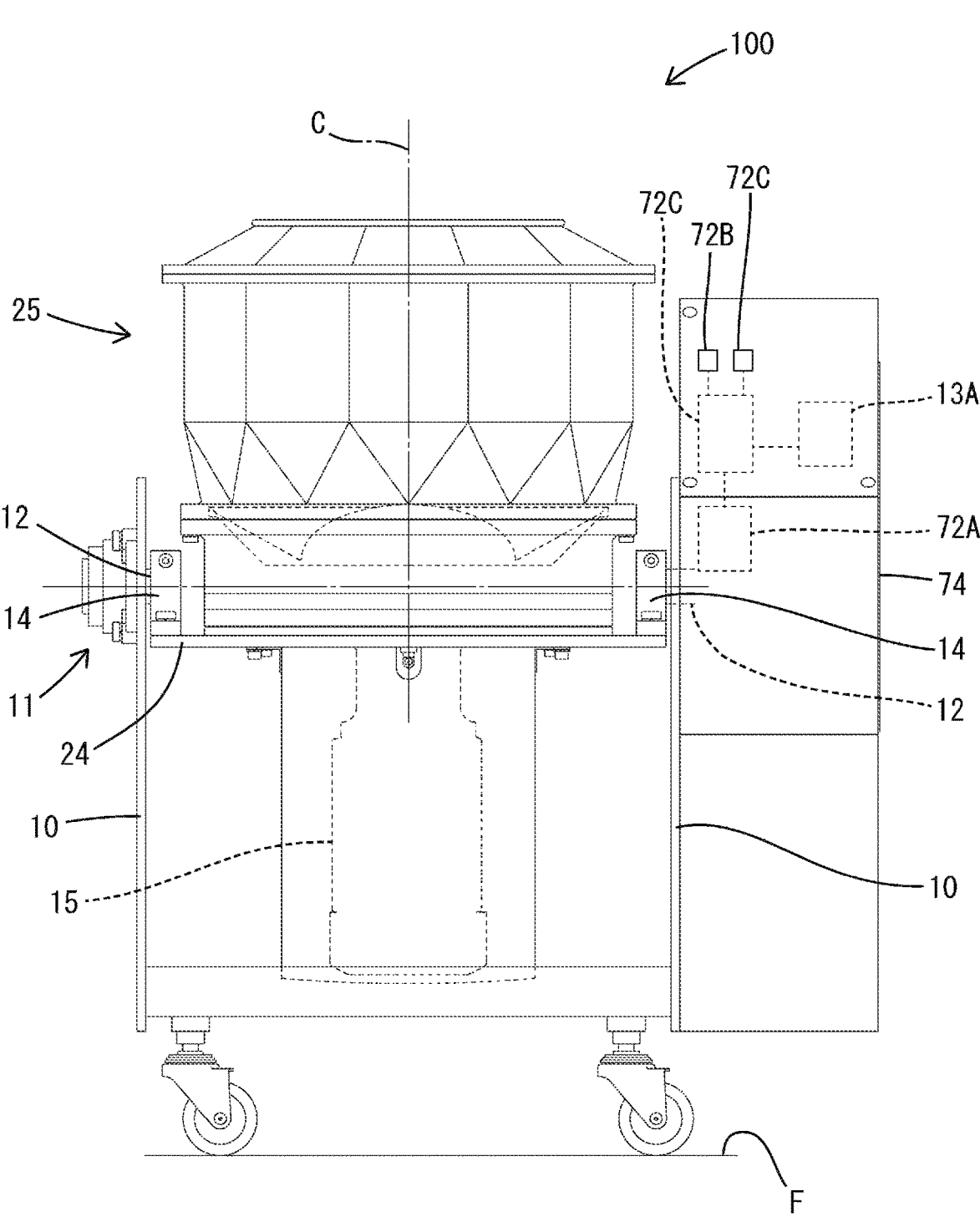
FIG. 2 is a front view illustrating a state in which the coating tank is set in a standing posture.
Figure 3:
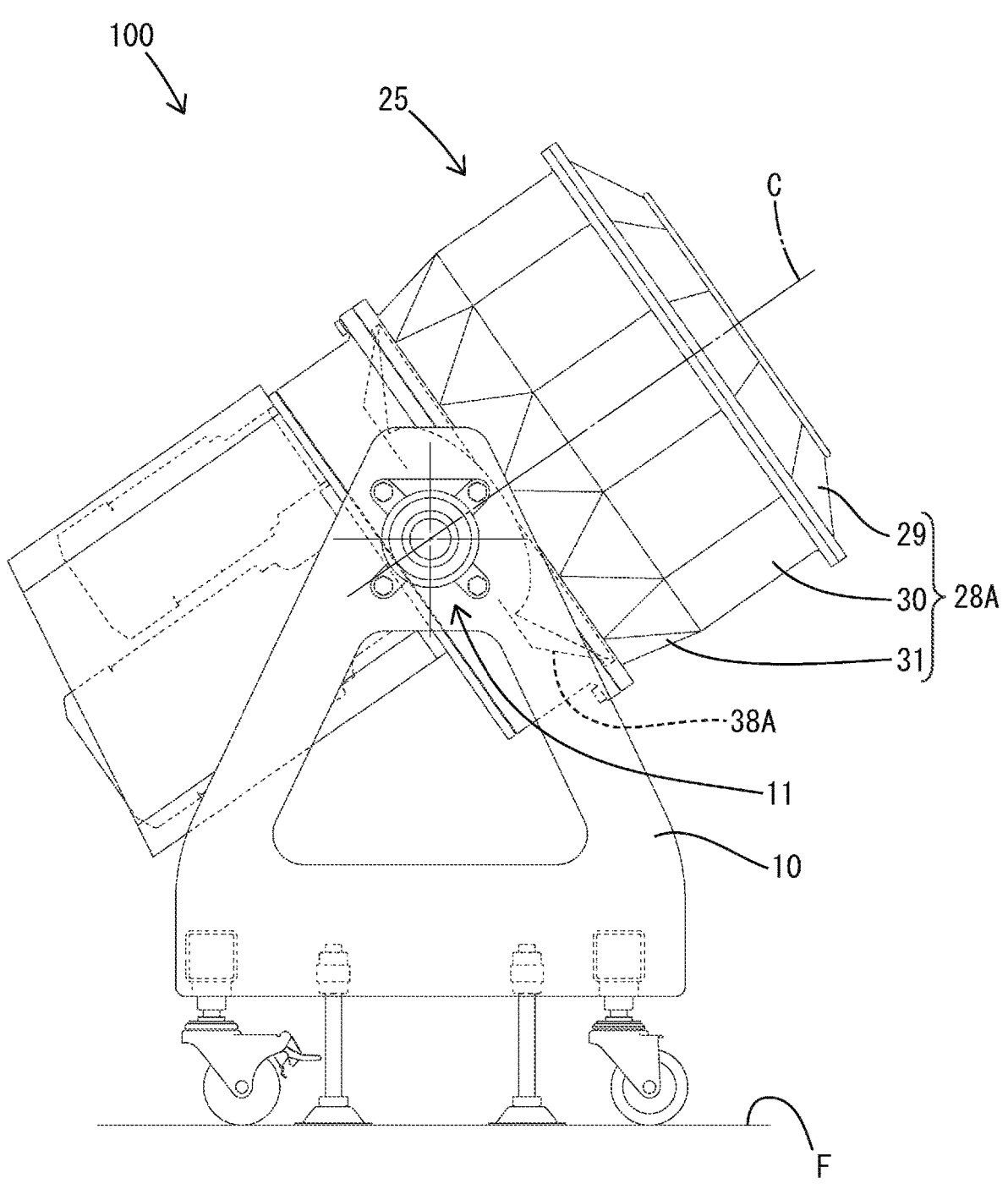
FIG. 3 is a side view illustrating a state in which the coating tank is set in an inclined posture.

As illustrated in FIG. 2, the tilting mechanism 11 includes a pair of horizontal tilting shafts 12 provided on the base 10 at intervals in the horizontal direction, and a tilting motor 13A for rotating the tilting shafts 12 by a predetermined angle. A rotational force generated in the tilting motor 13A is transmitted to the tilting shafts 12. The tilting motor 13A is accommodated in an accommodation unit 74 provided on the base 10, and is electrically connected to a control device 72 (see FIGS. 2 and 7). The control device 72 is accommodated in the accommodation unit 74. The rotation speed and the rotation direction of the tilting motor 13A are controlled by the control device 72. A pair of tilting frames 14 supporting the coating tank 25 is attached to ends of the pair of tilting shafts 12 so as to be integrally tiltable. A base plate 24 is fixed to the pair of tilting frames 14.

Figure 4:
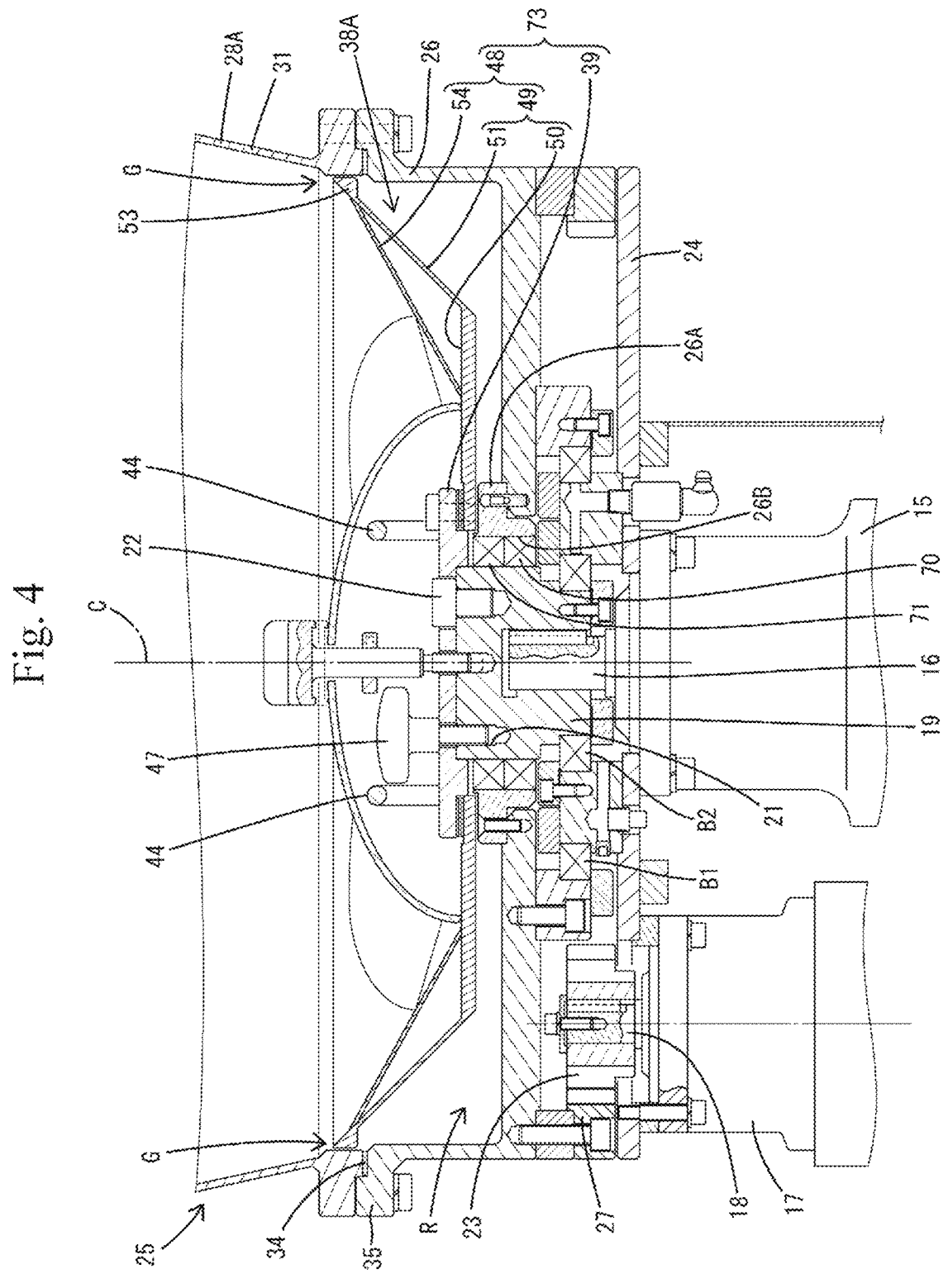
FIG. 4 is a partial cross-sectional view of the coating tank.

A first motor 15 and a second motor 17 are attached to the base plate 24 so as to be integrally tiltable with the base plate 24. As illustrated in FIG. 4, the first motor 15 includes a first drive shaft 16 protruding upward coaxially with the rotation axis C of the coating tank 25. The first drive shaft 16 is a power transmission shaft that rotates in both forward and reverse directions. The first drive shaft 16 is provided with a rotating member 19 having a substantially columnar shape so as to be integrally rotatable with the first drive shaft 16. The rotating member 19 is disposed above the base plate 24 via a bearing B2.

The second motor 17 includes a second drive shaft 18 parallel to the first drive shaft 16 and protruding upward. The second motor 17 is disposed in a positional relationship eccentric with respect to the first motor 15. Therefore, the second drive shaft 18 rotates in both forward and reverse directions independently of the first drive shaft 16. A drive gear 23 is attached to the second drive shaft 18 so as to be integrally rotatable. Each of the first motor 15 and the second motor 17 is electrically connected to the control device 72 (see FIG. 7), and controlled such that the rotation speed and the rotation direction thereof are individually operated by the control device 72. The first drive shaft 16 and the second drive shaft 18 penetrate the base plate 24 and protrude upward.

[Configuration of Underplate]

The underplate 26 forms a circular dish shape whose upper surface is recessed downward. The underplate 26 is supported by the base plate 24 via a bearing B1 so as to be coaxial with the first drive shaft 16 and relatively rotatable with respect to the first drive shaft 16 (i.e., so as to be rotatable independently of the first drive shaft 16). A central portion of the underplate 26 is provided with an annular member 26A having an annular shape concentric with the underplate 26. An opening inside the annular member 26A constitutes a through hole 26B having a circular shape concentric with the underplate 26. An inner peripheral edge of the through hole 26B on the upper surface of the annular member 26A is provided with a protrusion 26C having an annular shape protruding upward over the entire circumference (see FIG. 5).

A first seal member 70 having an annular shape and a second seal member 71 having an annular shape are fitted into the through hole 26B of the annular member 26A. The second seal member 71 is provided on the first seal member 70. Specifically, the first seal member 70 and the second seal member 71 are adjacent to each other in the up-down direction. The upper end of the second seal member 71 is disposed at substantially the same height as the upper end of the protrusion 26C. A known oil seal, for example, is used for the first seal member 70 and the second seal member 71.

The rotating member 19 of the first drive shaft 16 is inserted in the first seal member 70 and the second seal member 71. That is, the rotating member 19 is inserted into the through hole 26B penetrating the underplate 26. The outer peripheral surface of the rotating member 19 is in contact with a lip 70E of the first seal member 70 and a lip 71E of the second seal member 71. The first seal member 70 and the second seal member 71 are provided so as to fill a space between the outer peripheral surface of the rotating member 19 and the inner peripheral surface of the through hole 26B in a liquid-tight manner.

The bearings B1 and B2 disposed below the first seal member 70 are configured such that lubricant (i.e., fluid) such as grease can be injected thereinto. The first seal member 70 has a function of preventing the lubricant such as grease overflowing from the bearings B1 and B2 from moving upward in the through hole 26B.

An internal gear 27 coaxial with the underplate 26 is attached to an outer peripheral edge portion of the lower surface of the underplate 26 so as to be integrally rotatable (see FIG. 4). The internal gear 27 meshes with the drive gear 23 of the second drive shaft 18. When the drive gear 23 and the internal gear 27 mesh with each other, the rotational force generated by the second motor 17 is transmitted to the underplate 26, whereby the underplate 26 is rotationally driven in one direction and the other direction around the rotation axis C.

[Configuration of Drum]

As illustrated in FIG. 1, the drum 28A has a substantially cylindrical shape with both upper and lower ends opened as a whole. The drum 28A includes a narrowing portion 29, a body portion 30, and a tapered portion 31. The drum 28A is fixed to the underplate 26 and is rotatable integrally with the underplate 26. The narrowing portion 29 has a form whose diameter decreases upward, and is constituted of twelve trapezoidal constituent surfaces 29A arranged side by side in the circumferential direction.

The body portion 30 is continuous with the lower end edge of the narrowing portion 29, and the diameter dimension thereof is substantially constant from the upper end to the lower end. The inner peripheral surface of the body portion 30 is constituted of twelve rectangular constituent surfaces 30A, each having a planar shape, arranged side by side in the circumferential direction. The upper end edge of the body portion 30 and the lower end edge of the narrowing portion 29 are coupled by a magnet not illustrated. The narrowing portion 29 can be easily removed from the body portion 30 by being lifted.

The tapered portion 31 is continuous with the lower end edge of the body portion 30 and the diameter thereof gradually decreases downward. The tapered portion 31 is constituted of twelve upward triangular constituent surfaces 31A and twelve downward triangular constituent surfaces 31B alternately arranged side by side in the circumferential direction. The tapered portion 31 has a diameter which gradually decreases downward.

As illustrated in FIG. 4, the drum 28A is detachably attached to a flange portion 35 provided at the upper end portion of the underplate 26, via a gasket 34 made of synthetic resin such as polytetrafluoroethylene (PTFE) and formed in an annular shape, so as to be coaxially and integrally rotatable. The underplate 26 closes the opening of the lower end of the tapered portion 31 of the drum 28A.

[Configuration of Disk]

Figure 5:
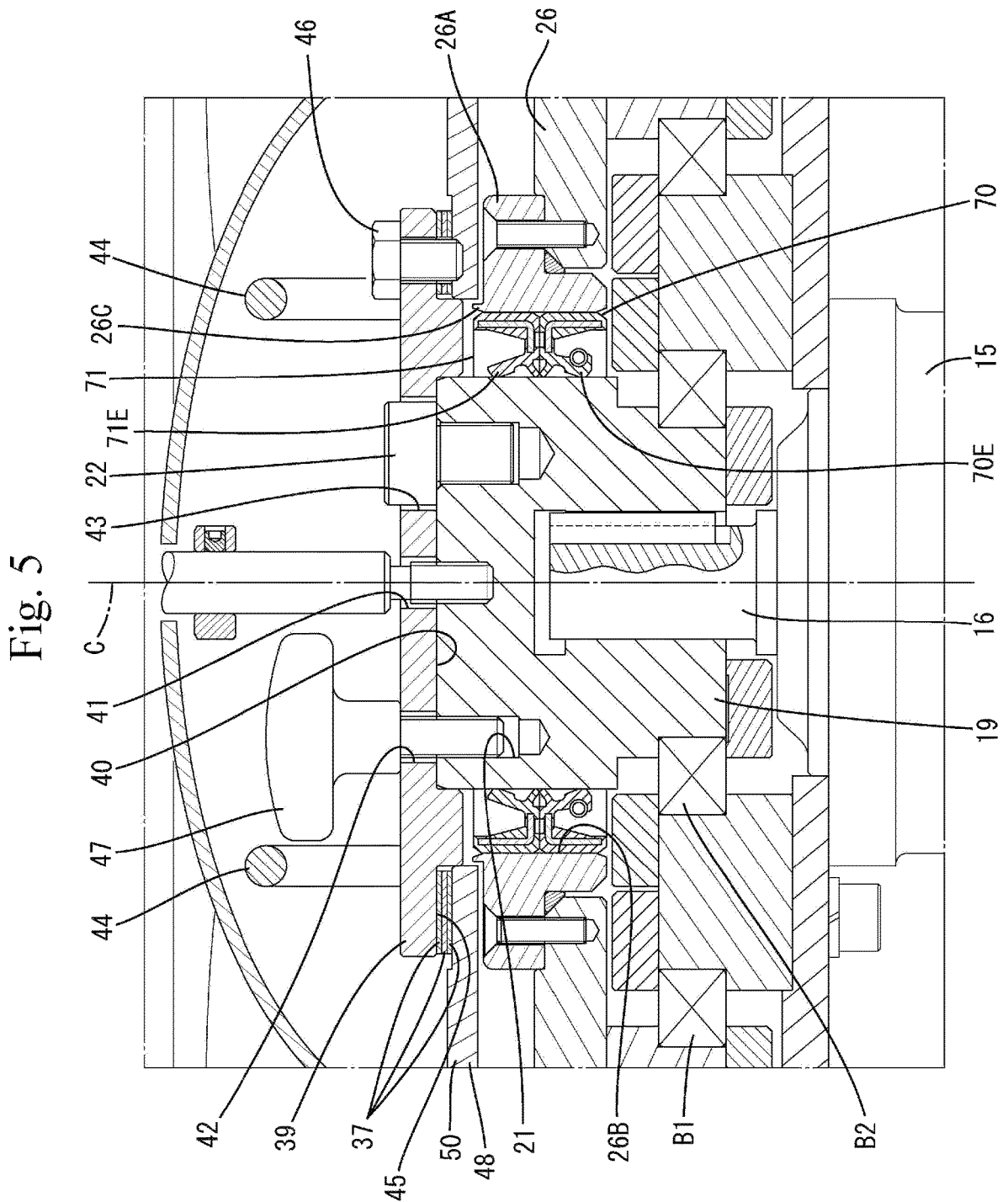
FIG. 5 is an enlarged cross-sectional view of a main part of the coating tank.
Figure 6:
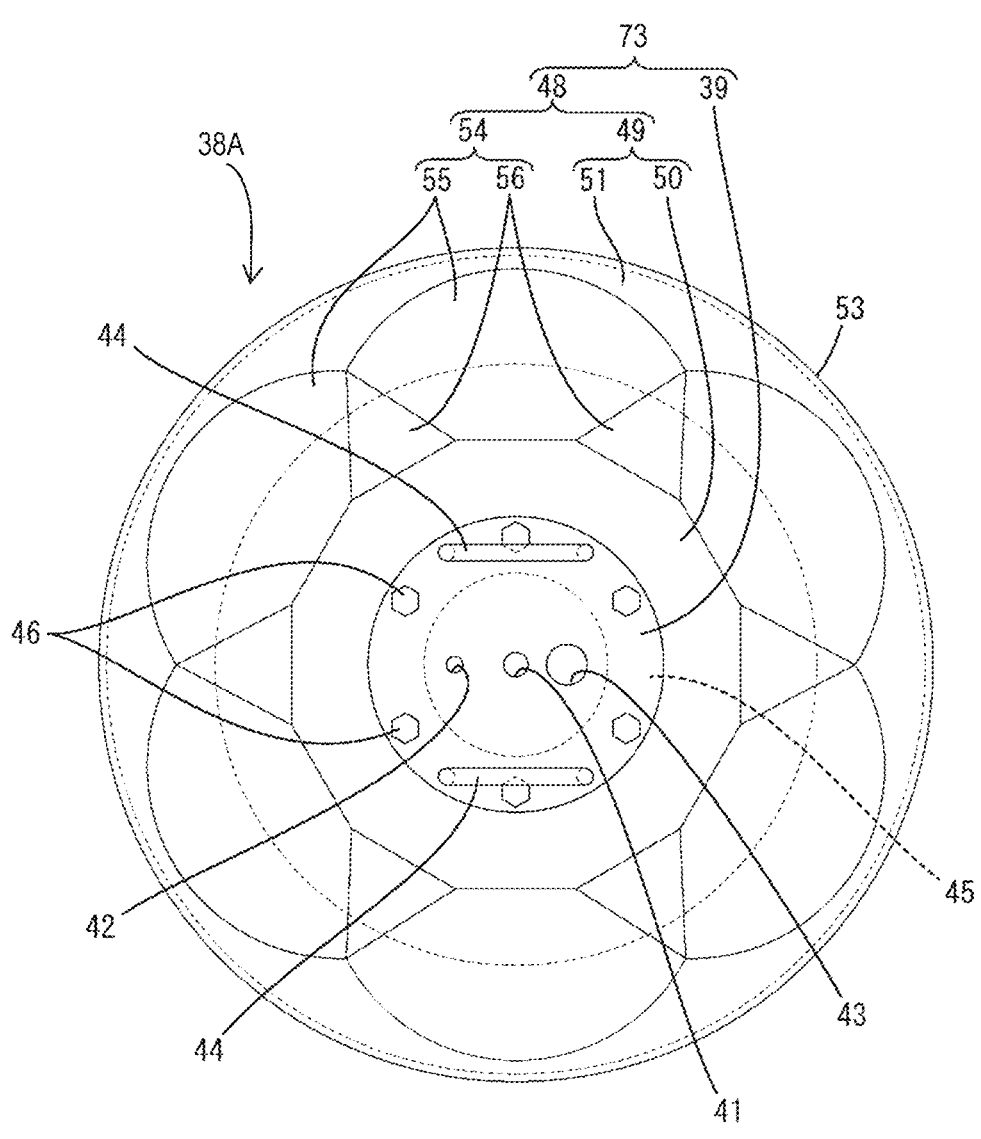
FIG. 6 is a plan view of a disk.

As illustrated in FIGS. 4 and 6, the disk 38A includes a disk body portion 73 having a disk shape and a reinforcing portion 53 having an annular shape. The disk body portion 73 forms a dish-like shape by coaxially assembling an attachment member 39 having a circular plate shape and a functional member 48 having an annular shape. As illustrated in FIG. 5, a recess 40 recessed upward is formed on the lower side of the central portion of the attachment member 39. The attachment member 39 includes a central through hole 41, an eccentric through hole 42, and a relief hole 43. The central through hole 41 penetrates the attachment member 39 in the up-down direction at a central position of the attachment member 39. The eccentric through hole 42 penetrates the attachment member 39 in the up-down direction at a position eccentric from the center of the attachment member 39 and corresponding to an eccentric female screw hole 21 of the rotating member 19. The relief hole 43 penetrates the attachment member 39 in the up-down direction at a position eccentric from the center of the attachment member 39 and corresponding to a pin 22. The upper surface of the attachment member 39 is provided with a pair of handles 44. On the lower side of the outer peripheral edge portion of the attachment member 39, an outer peripheral edge recess 45 recessed upward over the entire circumference is formed.

The attachment member 39 is placed on the rotating member 19 with the recess 40 being fitted to the upper end portion of the rotating member 19, thereby being assembled coaxially with the rotating member 19 and in a state where relative displacement in the radial direction is restricted with respect to the rotating member 19. Then, a bolt 47 with handle penetrating the eccentric through hole 42 is fastened to the eccentric female screw hole 21, whereby the attachment member 39 is restricted from being relatively displaced upward and is fixed so as to be integrally rotatable with respect to the rotating member 19. The pin 22 of the rotating member 19 is fitted in the relief hole 43, whereby the attachment member 39 is positioned in the circumferential direction with respect to the rotating member 19.

As illustrated in FIGS. 4 and 6, the functional member 48 includes an outer surface portion 49 and an inner surface portion 54 covering an upper surface side of the outer surface portion 49. The outer surface portion 49 includes an annular portion 50 having a horizontal and circular shape and an inclined portion 51 having a tapered shape extending obliquely outward and upward from an outer peripheral edge of the annular portion 50. In the outer peripheral edge portion (uppermost end edge portion) of the outer surface portion 49 (the inclined portion 51), the reinforcing portion 53 having an increased radial dimension is provided along the outer peripheral surface. The outer peripheral edge of the outer surface portion 49 (i.e., the disk 38A) is maintained in a perfect circular shape by the reinforcing portion 53.

The inner surface portion 54 has the inner peripheral edge continuous to the upper surface of the annular portion 50 without a gap, and forms a tapered shape extending obliquely outward and upward at an inclination angle smaller than that of the inclined portion 51. The outer peripheral edge (uppermost end edge) of the inner surface portion 54 is continuous to the inner surface (upper surface) of the outer surface portion 49 without a gap. The inner surface (upper surface) of the inner surface portion 54 has a mortar shape as a whole. Specifically, as illustrated in FIG. 6, the inner surface portion 54 includes six fan-shaped discontinuous surfaces 55 each having a substantially planar and petal shape, and six triangular discontinuous surfaces 56 each having a substantially planar and isosceles triangle shape.

The six fan-shaped discontinuous surfaces 55 and the six triangular discontinuous surfaces 56 are each arranged at an equiangular pitch in the circumferential direction, and the fan-shaped discontinuous surface 55 and the triangular discontinuous surface 56 are alternately arranged side by side adjacent to each other in the circumferential direction. A boundary line between the fan-shaped discontinuous surface 55 and the triangular discontinuous surface 56 adjacent to each other in the circumferential direction extends in a direction intersecting the circumferential direction, and the fan-shaped discontinuous surface 55 and the triangular discontinuous surface 56 are continued not flush but in an obtuse angle (i.e., discontinuous). Therefore, the centers placed on the upper surface of the inner surface portion 54 are easily caught at the obtuse-angled boundary between the adjacent fan-shaped discontinuous surface 55 and the triangular discontinuous surface 56, and less likely to slide in the circumferential direction on the inner surface portion 54.

The inner edge of the fan-shaped discontinuous surface 55 and the inner edge of the triangular discontinuous surface 56 are along the inner peripheral edge portion of the annular portion 50. A vertex portion of the triangular discontinuous surface 56 on the outermost peripheral side is disposed to be held between acute-angled end portions of the adjacent fan-shaped discontinuous surfaces 55. The entire region of the outer peripheral edge of the fan-shaped discontinuous surface 55 is positioned inside relative to the outer peripheral edge of the inclined portion 51.

As illustrated in FIG. 5, the functional member 48 is attached to the lower surface of the outer peripheral edge recess 45 via a plurality of spacers 37 by fitting the inner peripheral edge portion of the annular portion 50 to the outer peripheral edge recess 45 of the attachment member 39 from below. Specifically, six bolts 46 (see FIG. 6) penetrating the outer peripheral edge portion of the attachment member 39 in the plate thickness direction are fastened to the annular portion 50, whereby the functional member 48 is attached to the attachment member 39. The functional member 48 is assembled to the attachment member 39 in a state where relative rotation in the horizontal direction (radial direction and circumferential direction) is restricted.

The disk 38A thus configured is disposed above the underplate 26 so as to close the lower end of the drum 28A. The disk 38A is coupled to the first drive shaft 16 via the rotating member 19 so as to be integrally rotatable. That is, the first drive shaft 16 transmits the rotational force of the first motor 15 to the disk 38A. The disk 38A can rotate coaxially with the drum 28A. The reinforcing portion 53 (outer peripheral edge) of the disk 38A is disposed along an inner peripheral surface of a lower end portion of the tapered portion 31 of the drum 28A. That is, the disk 38A closes the opening of the lower end of the tapered portion 31 of the drum 28A. A gap G is provided between the outer peripheral surface of the reinforcing portion 53 of the disk 38A and the inner peripheral surface of the lower end portion of the tapered portion 31 of the drum 28A. The gap G is substantially constant over the entire circumference of the disk 38A.

[Configuration of Control Device]

Figure 7:
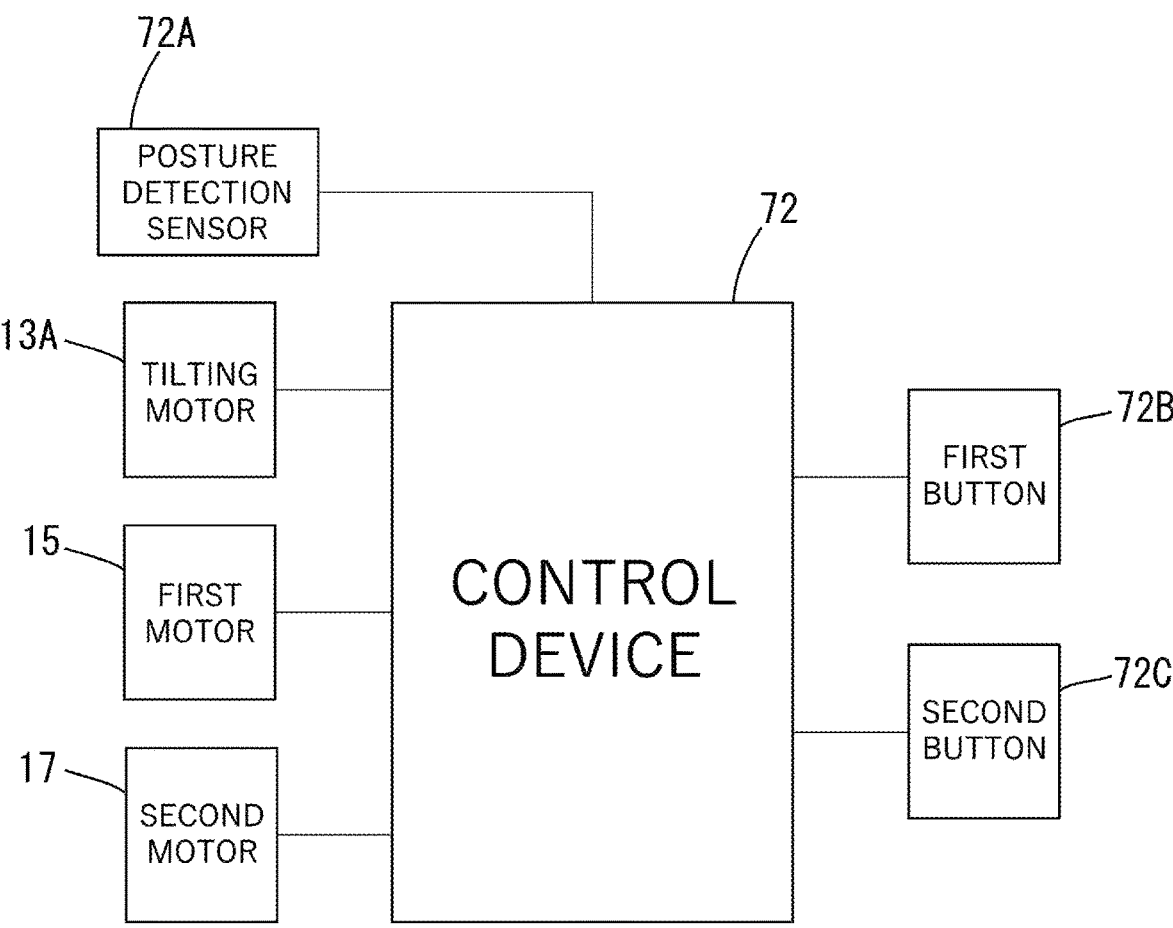
FIG. 7 is a block diagram illustrating a control device and each part electrically connected to the control device.
Figure 8:
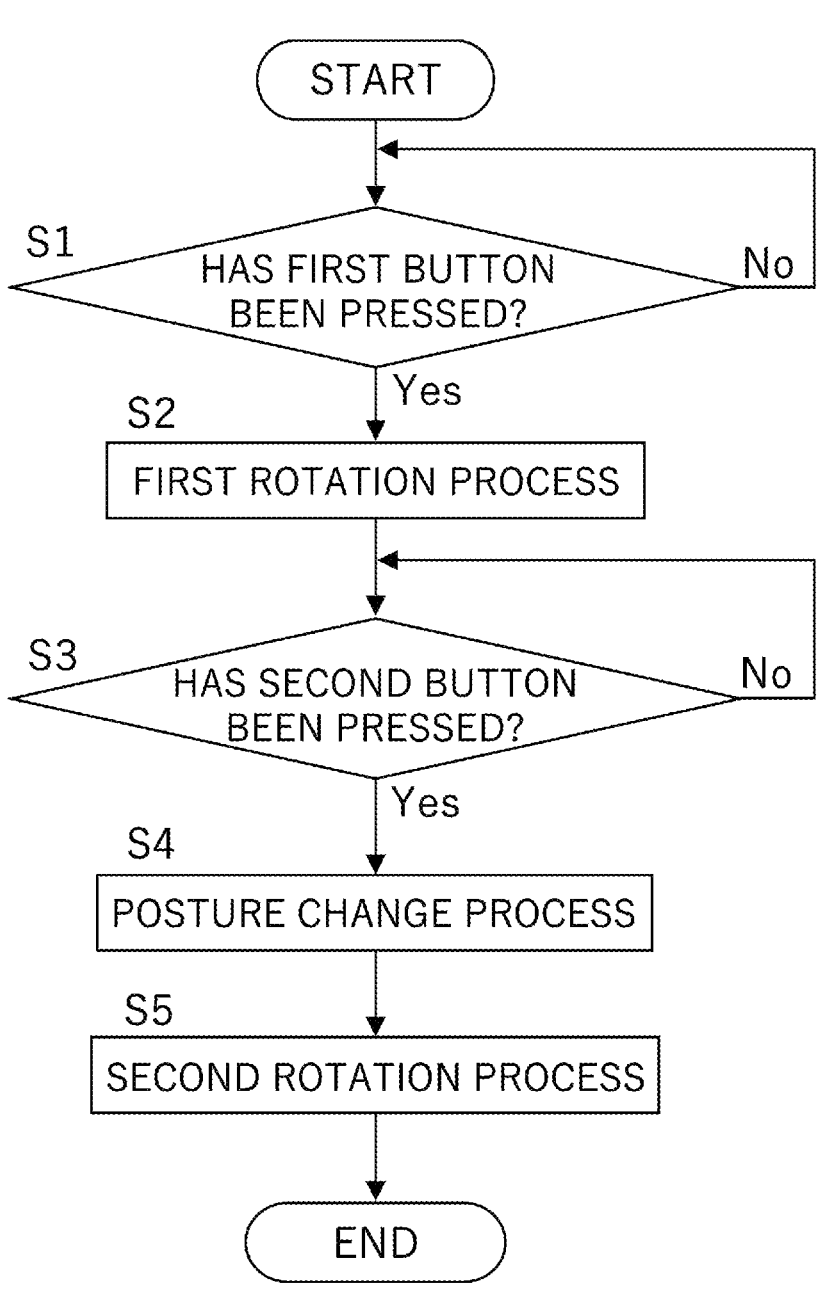
FIG. 8 is a flowchart showing a control method of the coating device executed in the control device.

As the control device 72, a programmable logic controller (PLC) or a programmable controller (PC) mainly configured by a microcomputer, for example, is used. The control device 72 has a function of controlling the rotation speeds and the rotation directions of the tilting motor 13A, the first motor 15, and the second motor 17. As illustrated in FIGS. 2 and 7, a posture detection sensor 72A which detects whether the posture of the coating tank 25 is a standing posture or an inclined posture is electrically connected to the control device 72. The posture detection sensor 72A is accommodated in the accommodation unit 74. Furthermore, a first button 72B and a second button 72C are electrically connected to the control device 72, and are attached to, for example, the upper surface of the accommodation unit 74 which is a position where the user can easily press.

When the first button 72B is pressed, the control device 72 controls the rotation direction of the second motor 17 so as to rotate the drum 28A in one direction, and controls the rotation direction of the first motor 15 so as to rotate the disk 38A in the other direction. Furthermore, if the signal from the posture detection sensor 72A is not a signal corresponding to the standing posture, the control device 72 controls the operation of the tilting motor 13A so as to change the posture of the coating tank 25 from the inclined posture to the standing posture. In this manner, when the first button 72B is pressed, the control device 72 executes the first rotation process of setting the coating tank 25 in the standing posture, rotating the drum 28A in one direction, and rotating the disk 38A in the other direction.

When the second button 72C is pressed, the control device 72 controls the rotation direction of the second motor 17 so as to rotate the drum 28A in one direction, and controls the rotation direction of the first motor 15 so as to rotate the disk 38A also in one direction. Furthermore, if the signal from the posture detection sensor 72A is not a signal corresponding to the inclined posture, the control device 72 controls the operation of the tilting motor 13A so as to change the posture of the coating tank 25 from the standing posture to the inclined posture.

When the second button 72C is pressed in a state where the first button 72B is already pressed (i.e., the first rotation process is in execution), the control device 72 controls the operation of the tilting motor 13A so as to change the posture of the coating tank 25 from the standing posture to the inclined posture, thus executing a posture change process.

During execution of the posture change process, the control device 72 controls the rotation speed of the first motor 15 so as to stop the rotation of the disk 38A rotating in the other direction. Then, after the rotation of the disk 38A is stopped, the control device 72 controls the rotation direction of the first motor 15 so as to rotate the disk 38A in one direction. Furthermore, the control device 72 controls the rotation speed of the first motor 15 such that the rotation speed of the disk 38A rotating in one direction around the rotation axis C becomes equal to the rotation speed of the drum 28A. The control device 72 makes the rotation speed of the disk 38A equal to the rotation speed of the drum 28A before the posture of the coating tank 25 becomes the inclined posture (i.e., before the posture change process is completed). When the posture change process is completed, the control device 72 executes the second rotation process. In this manner, the control device 72 executes each process of the first rotation process, the posture change process, and the second rotation process in this order.

[Control Method of Coating Device]

Next, an example of the control method of the coating device 100 of the present embodiment will be described. First, the centers are input in the coating tank 25 in a state where the drum 28A and the underplate 26 are not rotated. Then, in step S1 in FIG. 8, the control device 72 determines whether or not the first button 72B has been pressed. In step S1, when determining that the first button 72B has not been pressed (No in step S1), the control device 72 does not start the first rotation process, and the coating device 100 is set in a standby state. In step S1, when the control device 72 determines that the first button 72B has been pressed (Yes in step S1), the process proceeds to step S2.

When the process proceeds to step S2, the control device 72 executes the first rotation process. Specifically, the control device 72 rotates the drum 28A and the underplate 26 in one direction at a relatively low speed, and rotates the disk 38A in the other direction at a high speed. At this time, if the signal from the posture detection sensor 72A is not a signal corresponding to the standing posture, the control device 72 controls the operation of the tilting motor 13A so as to change the posture of the coating tank 25 to the standing posture in which the rotation axis C of the coating tank 25 is directed in the vertical direction.

The centers having been input are given a rotational force by catching action due to the boundary between the fan-shaped discontinuous surface 55 and the triangular discontinuous surface 56 on the disk 38A, and the centers move upward by a centrifugal force in a spiral direction along the tapered upper surface of the functional member 48 and the inner wall of the drum 28A. Then, the centers appear on the surface layer, slide down in the spiral direction by gravity, return to near the center of the disk 38A, and are rotationally driven by the disk 38A again. In the first rotation process, the centers in the coating tank 25 repeat such swirling circulating flow. When a coating agent is sprayed to a center group being stirred by this swirling circulating flow, a coating layer is formed on the surface of each center.

In the coating method using this swirl, the disk 38A is rotated at a high speed in order to apply a centrifugal force to the centers. Therefore, the flow speed of the center group is high and the stirring effect is also high, and thus there is an advantage that the coating treatment can be performed in a short period of time. The rotation speed of the drum 28A in one direction at this time is about 0 rpm (i.e., rotation is stopped) to 60 rpm. On the other hand, the rotation speed of the disk 38A in the other direction is 50 rpm to 300 rpm.

Next, the process proceeds to step S3. When determining in step S3 that the second button 72C has not been pressed (No in step S3), the control device 72 continues the execution of the first rotation process while repeatedly executing the determination in step S3. When the control device 72 determines in step S3 that the second button 72C has been pressed (Yes in step S3), the process proceeds to step S4.

When the process proceeds to step S4, the control device 72 executes the posture change process of changing the posture of the coating tank 25 from the standing posture to the inclined posture. The posture change process is executed between the first rotation process and the second rotation process. Then, simultaneously with the start of the execution of the posture change process or during the execution of the posture change process, the control device 72 starts to decelerate the rotation speed of the disk 38A rotating in the other direction. Then, after the rotation of the disk 38A is stopped, the control device 72 rotates the disk 38A in one direction. That is, the control device 72 switches the rotation direction of the disk 38A from the other direction to one direction during the execution of the posture change process.

Then, before the posture of the coating tank 25 becomes the inclined posture (i.e., during the execution of the posture change process), the control device 72 causes the rotation speed of the disk 38A in one direction to reach the same rotation speed as the drum 28A. Then, when the posture of the coating tank 25 is set in the inclined posture and the posture change process is ended, the process proceeds to step S5.

When the process proceeds to step S5, the control device 72 executes the second rotation process. In the second rotation process, the posture of the coating tank 25 is set in an inclined posture in which the rotation axis C is inclined with respect to the vertical direction, and the drum 28A and the disk 38A are rotated in one direction.

In the second rotation process, the centers having been input in the coating tank 25 are lifted forward in the rotation direction, by friction with the inner periphery of the coating tank 25 (the inner wall surface of the drum 28A and the upper surface of the disk 38A) and a catching action due to the fan-shaped discontinuous surfaces 55 and the triangular discontinuous surfaces 56. Then, the centers slide down by their own weight, and are lifted up again by the friction with the inner wall surface of the drum 28A and the catching action due to the fan-shaped discontinuous surfaces 55 and the triangular discontinuous surfaces 56. In the second rotation process, the centers in the coating tank 25 repeat such circulating flow. This can reduce variation in the finish of the coating in each center. At this time, the inclination angle of the coating tank 25 with respect to the vertical direction is preferably 45° to 70°.

In the second rotation process, if the coating tank 25 is rotated at a high speed, the center group may stick to the inner periphery of the coating tank 25 due to a strong centrifugal force, and may not circulate and flow. Therefore, the coating tank 25 is rotationally driven at a relatively low speed. Specifically, the rotation speeds of the drum 28A and the disk 38A are about 5 rpm to 50 rpm unlike those in the first rotation process.

Operations and Effects of Embodiments

The control method of the coating device is a control method of the coating device including the coating tank 25. The coating tank 25 includes the drum 28A having a cylindrical shape and the disk 38A having a dish shape. The drum 28A is rotatable. The disk 38A is disposed to close the lower end of the drum 28A, and is rotatable coaxially with the drum 28A. The control method of the coating device executes the first rotation process and the second rotation process. In the first rotation process, the posture of the coating tank 25 including the drum 28A and the disk 38A is set in a standing posture in which the rotation axis C of the coating tank 25 is directed in the vertical direction, the drum 28A is rotated in one direction around the rotation axis C, and the disk 38A is rotated in the other direction around the rotation axis C. In the second rotation process, the posture of the coating tank 25 is set in an inclined posture in which the rotation axis C is inclined with respect to the vertical direction, and the drum 28A and the disk 38A are rotated in one direction around the rotation axis C.

According to this configuration, the time required for coating the coating targets can be shortened, by the first rotation process, and unevenness of the coating of each coating target can be reduced by the second rotation process. The coating targets thus can be coated well by these two rotation processes.

The control method of the coating device further includes the posture change process of changing the posture of the coating tank 25 from the standing posture to the inclined posture between the first rotation process and the second rotation process. During execution of the posture change process, the rotation direction of the drum 28A is maintained in one direction around the rotation axis C, and the deceleration of the rotation speed of the disk 38A around the rotation axis C is started simultaneously with the start of the execution of the posture change process or during the execution of the posture change process. According to this configuration, since the rotation speed of the disk 38A is not decelerated in the first rotation process, the first rotation process can be reliably executed.

The control method of the coating device switches the rotation direction of the disk 38A from the other direction around the rotation axis C to one direction around the rotation axis C during the execution of the posture change process. According to this configuration, since it is not necessary to switch the rotation direction of the disk 38A during the execution of the first rotation process and the second rotation process, it is possible to avoid the rotation of the disk 38A from being stopped in the first rotation process and the second rotation process. This can reliably execute the first rotation process and the second rotation process. If the rotation direction of the disk 38A is set to be the same as the rotation direction of the drum 28A when the coating tank 25 is in a standing posture, the coating targets rotate synchronously while sticking to the inner peripheral surface of the coating tank 25, so that relative displacement between the coating targets hardly occurs, and as a result, the coating targets may adhere to each other. In contrast, in the control method of the coating device, since the rotation direction of the disk 38A is set to be the same as the rotation direction of the drum 28A during the execution of the posture change process, the coating targets easily fall due to their own weight, and thus the relative displacement between the coating targets can be prevented from hardly occurring.

In the control method of the coating device, during the execution of the posture change process, the rotation speed of the disk 38A in one direction around the rotation axis C is caused to reach the same rotation speed as the drum 28A. According to this configuration, since the rotation speeds of the disk 38A and the drum 28A can be matched before the second rotation process is executed and the disk 38A and the drum 28A can be integrally rotated, motion of the coating targets is not stopped, and the process can proceed to the second rotation process without the coating targets adhering to the inner peripheral surface of the coating tank 25.

Other Embodiments

The present invention is not limited to the embodiment described with reference to the above description and drawings, and can be achieved by various configurations in a scope not departing from the gist thereof. For example, various features of the embodiment described above and the embodiments described below may be combined in any way as long as they do not depart from the gist of the invention and do not contradict each other. If the technical features are not described as essential in the present description, they can be deleted as appropriate.

(1) Unlike the above embodiment, a light metal such as aluminum, a plated steel material, or a synthetic resin such as polyurethane, ultra-high molecular weight polyethylene (UPE), or polyacetal (POM) may be used in the coating tank.

(2) Unlike the above embodiment, in the first rotation process, the rotation axis of the coating tank may be slightly (about 15°) inclined with respect to the vertical direction. In this case also, the coating treatment can be performed well.

(3) Unlike the above embodiment, in the second rotation process, the rotation directions of the drum and the disk is set to one direction around the rotation axis, but the rotation speeds of the drum and the disk may be slightly different. In this case, the rotation speed of the disk may be faster or may be slower than the rotation speed of the drum.

(4) Unlike the above embodiment, as a means for transmitting the rotational force from the second motor to the drum, the drive shaft of a drive mechanism for the drum may be engaged with the external gear. Alternatively, the rotational force may be transmitted via a belt, or the rotational force may be transmitted via an idler or a roller.

(5) Unlike the above embodiment, the opening of the upper surface of the drum may be closed by a lid separate from the drum. In this case, the lid may be attached to the drum by a hinge or the like such that the lid can be opened and closed and cannot be easily removed from the drum. Alternatively, the lid may be attached to the drum by a bolt, recess-protrusion fitting, or the like, such that the lid can be attached to and detached from the drum relatively easily.

(6) Unlike the above embodiment, in the posture change process, the timing of starting the change from the standing posture to the inclined posture may be slightly earlier or may be slightly later than the timing of starting the deceleration of the rotation speed of the disk. The timing of completing the change from the standing posture to the inclined posture is completed may be slightly earlier than the timing at which the rotation speed of the disk reaches the rotation speed of the drum.

REFERENCE SIGNS LIST

25 coating tank
28A drum
38A disk
100 coating device

12

C rotation axis
S2 first rotation process
S4 posture change process
S5 second rotation process

The invention claimed is:

1. A control method of a coating device including a coating tank, the coating tank including a drum having a cylindrical shape and rotatable, and a disk having a dish shape and disposed to close a lower end of the drum and rotatable coaxially with the drum, wherein the method includes execution of:

a first rotation process of setting a posture of the coating tank in a standing posture in which a rotation axis of the coating tank is directed in a vertical direction, rotating the drum in one direction, and rotating the disk in an other direction;

a posture change process, after the first rotation process, of changing the posture of the coating tank from the standing posture to an inclined posture in which the rotation axis is inclined with respect to the vertical direction; and a second rotation process, posture change process, of rotating the drum and the disk in the one direction in a state where the posture of the coating tank has been changed to the inclined posture wherein a rotation direction of the disk is switched from the other direction to the one direction during execution of the posture change process, and a rotation of the drum in the one direction is maintained during execution of the posture change process.

2. The control method of a coating device according to claim 1, wherein deceleration of a rotation speed of the disk is started simultaneously with start of execution of the posture change process or during execution of the posture change process.

3. The control method of a coating device according to claim 1, wherein, during execution of the posture change process, a rotation speed of the disk in the one direction is caused to reach a rotation speed that is the same as a rotation speed of the drum.

* * * * *